United States Patent
Hanna

(10) Patent No.: US 11,019,471 B1
(45) Date of Patent: May 25, 2021

(54) INTERACTIVE ASSET LOCATION AND MANAGEMENT SYSTEM AND METHOD OF USE

(71) Applicant: Michael S. Hanna, Coppell, TX (US)

(72) Inventor: Michael S. Hanna, Coppell, TX (US)

( * ) Notice: Subject to any disclaimer, the term of this patent is extended or adjusted under 35 U.S.C. 154(b) by 0 days.

(21) Appl. No.: 15/178,910

(22) Filed: Jun. 10, 2016

Related U.S. Application Data

(60) Provisional application No. 62/174,034, filed on Jun. 11, 2015.

(51) Int. Cl.
*H04W 4/40* (2018.01)
*H04W 4/029* (2018.01)
*H04W 16/28* (2009.01)

(52) U.S. Cl.
CPC ............. *H04W 4/40* (2018.02); *H04W 4/029* (2018.02); *H04W 16/28* (2013.01)

(58) Field of Classification Search
CPC . G06Q 10/0833; H04L 67/2842; H04L 63/08; H04L 67/02; H04L 67/32; H04W 4/02; H04W 64/00; H04W 24/00; H04W 4/021; H04W 4/028; H04W 4/04; H04W 4/008; H04W 64/003; H04W 84/12; H04W 4/20; H04W 4/029; H04W 4/025; H04W 4/80; H04W 4/70; H04W 4/40; H04W 4/023; H04W 40/20; H04W 16/28; G01S 11/02; G01S 11/12; G06F 16/29; H04B 1/3833
USPC .............. 455/456.1, 404.2, 457; 340/539.13, 340/572.1, 8.1, 539.1, 539.26, 932.2, 988; 382/103
See application file for complete search history.

(56) References Cited

U.S. PATENT DOCUMENTS

| | | | |
|---|---|---|---|
| 2007/0252696 A1* | 11/2007 | Belisle | B60R 25/102 340/572.1 |
| 2008/0231446 A1* | 9/2008 | Cresto | G06Q 10/08 340/572.1 |
| 2009/0098907 A1* | 4/2009 | Huntzicker | G01C 21/12 455/556.1 |
| 2014/0344895 A1* | 11/2014 | Jimenez Arreola | H04L 63/08 726/4 |

* cited by examiner

*Primary Examiner* — Fred A Casca
(74) *Attorney, Agent, or Firm* — Richard Eldredge; Leavitt Eldredge Law Firm

(57) ABSTRACT

A car location identifier system includes a parking lot having a plurality of parking spaces; a plurality of cars parked in the parking spaces; a transmitter tag carried within each car of the plurality of car; a computer database configured to store the position of each transmitter tag; and a portable computer in data communication with the computer database, the portable having a visual display for identifying the location of the transmitter tag.

2 Claims, 4 Drawing Sheets

INTERACTIVE ASSET LOCATION AND MANAGEMENT SYSTEM AND METHOD OF USE

BACKGROUND

1. Field of the Invention

The present invention relates generally to asset location systems and more specifically to interactive asset location and management systems for car dealerships

2. Description of Related Art

Systems for locating one or more assets are well known in the art. For example, FIG. 1 depicts a conventional dealership system 101 wherein a salesman 105 assists a customer 107 in locating a vehicle 109 within a parking lot 103.

Problems commonly associated with system 101 include inefficient and time consuming efforts in physically searching for vehicle 109. Further, these problems are prone to increase with human error, poor asset management, or large lot sizes.

Although great strides have been made in the area of asset location and management systems for car dealerships, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
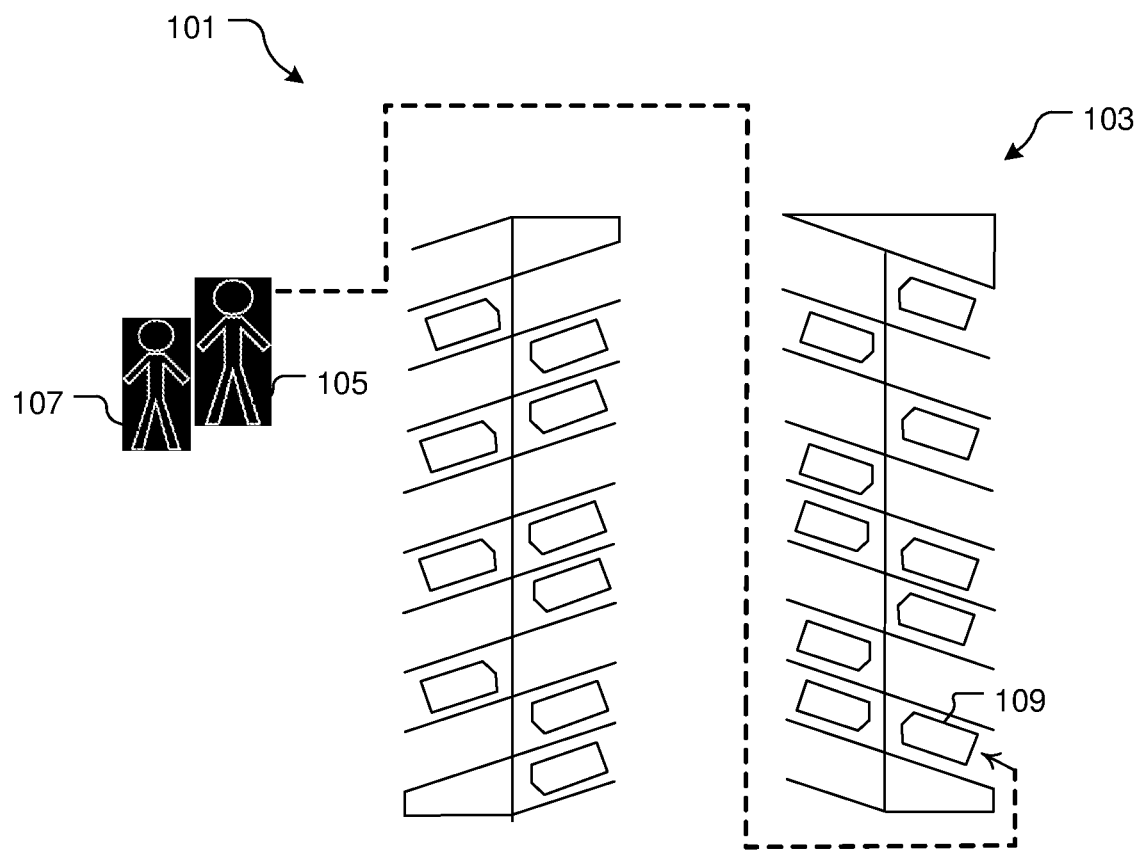
FIG. 1 is a top view of an asset location system at a conventional dealership.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional asset location and management systems. Specifically, the system and method of use of the present application provide efficient, automated means to locate and manage assets across a large area and with minimal risk of human error. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
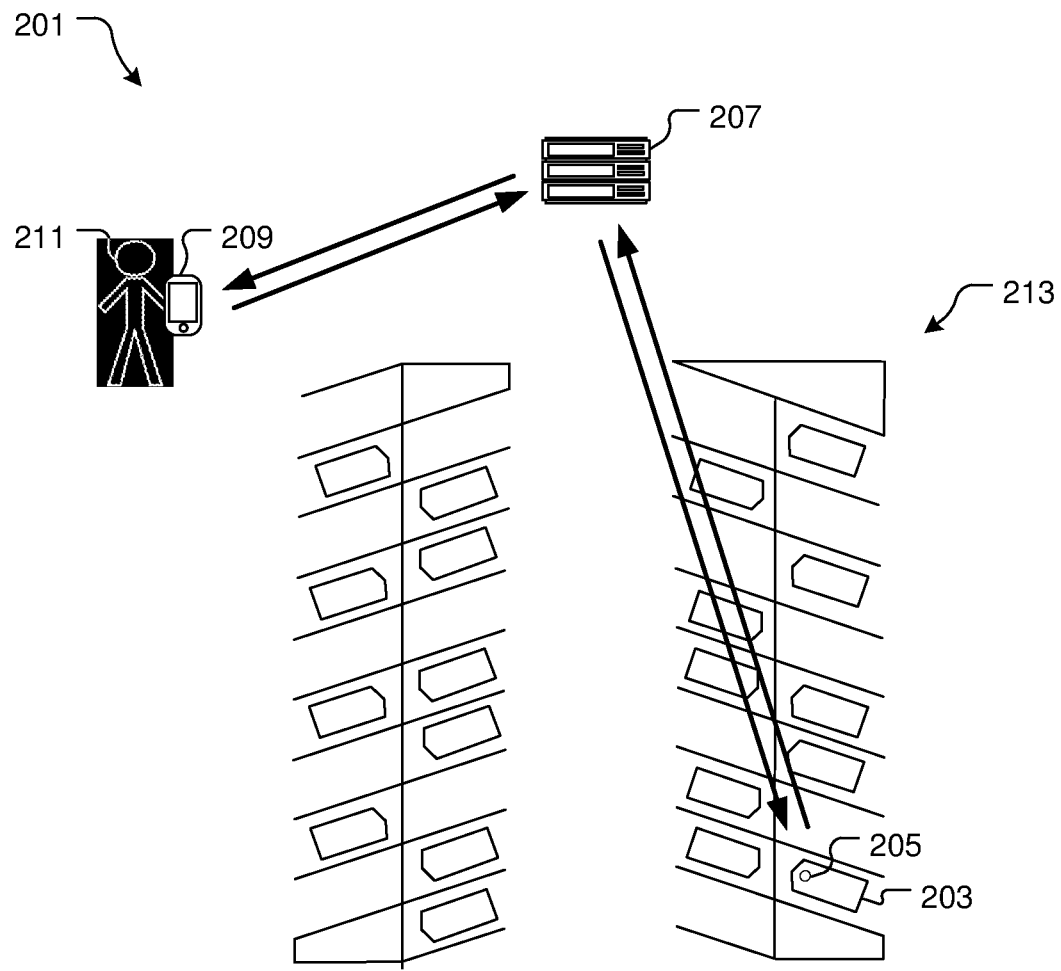
FIG. 2 is a top view of an interactive asset location and management system in accordance with a preferred embodiment of the present application.

Referring now to the drawings wherein like reference characters identify corresponding or similar elements throughout the several views, FIG. 2 depicts a top view of an interactive asset location and management system 201 in accordance with a preferred embodiment of the present application. System 201 comprises an asset 203 paired to a transmitter 205 in wireless communication with a transceiver of a computer 207 with a database that is also in wireless communication with a portable computer 209 such as a cellphone.

It is contemplated and will be appreciated that transmitter 205 can be made highly cost effective by using a low energy beacon such as Bluetooth that does not rely on geo-positioning or cellular technology and can be paired to asset 203 via transmitted IDs or barcodes. It will be further appreciated a user 211 can use querying device 209 to search for asset 203 via parameters such as stock number, asset ID, VIN #, or location within a parking lot 213. And that the asset can be paired to the Referring now to FIG. 3, a flowchart defining the process of FIG. 2 is shown. As described above system 201 comprises the following steps: individual assets paired to transmitters 303, said transmitters conveying asset information and locations to a database 305, one or more devices querying the database for asset information and locations 307, an interactive distance determination process 309, and the visualization of asset location and information on the querying device 311.

Figure 3:
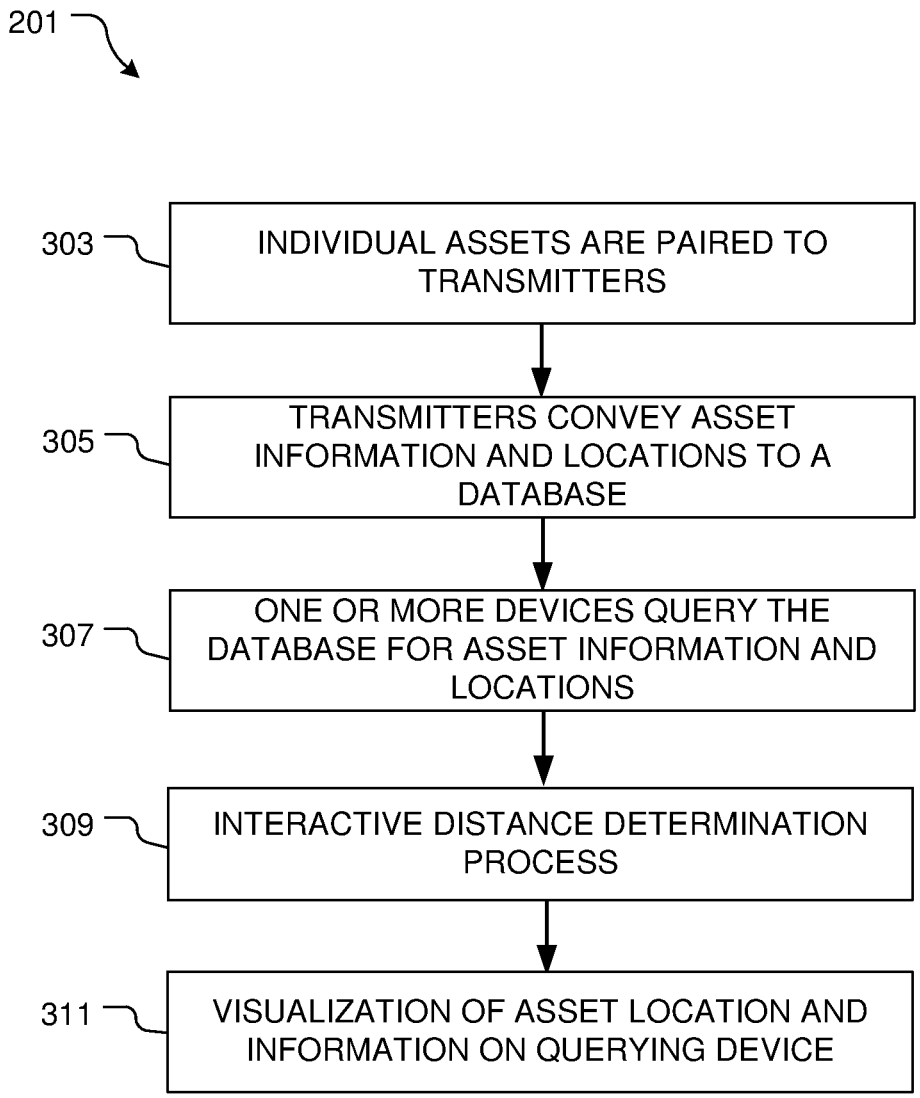
FIG. 3 is a flowchart defining the process of FIG. 2.

One of the unique features believed characteristic of the present application is that system 201 implements an interactive distance determination process and visualization software as demonstrated by steps 309 and 311 of FIG. 3, respectively.

Figure 4:
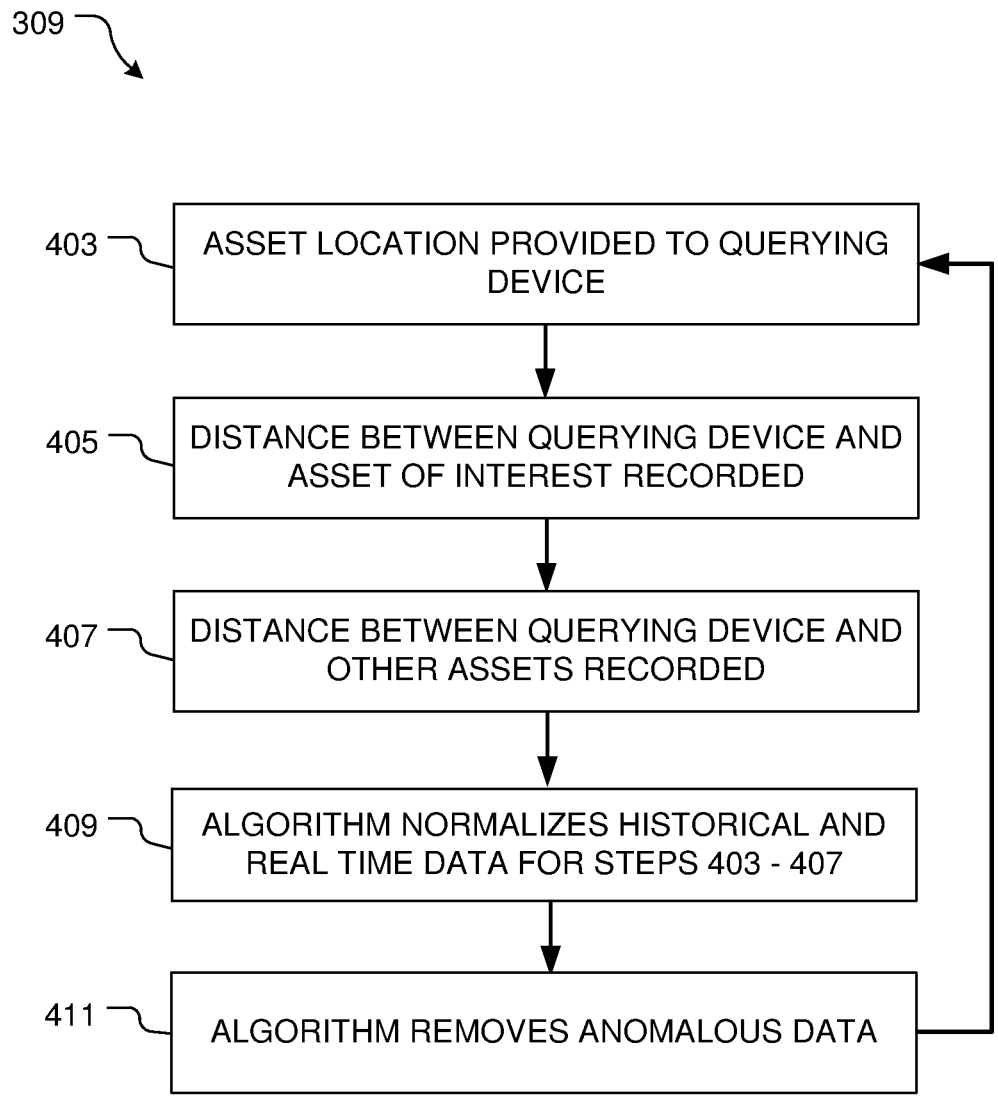
FIG. 4 is a flowchart defining the interactive distance determination sub-process of FIG. 3.

Referring now to FIG. 4 the interactive distance determination process of step 309 is shown. Here, step 309 incorporates a self-improving algorithm that provides asset location information 403 and distance 405 to a querying device (not shown). To increase the precision of asset location information 403 the algorithm also measures the distance of the querying device from other asset locations 407, normalizes all historical location data with real-time updates 409, and removes any anomalous data 411.

An alternative embodiment significantly enhances the interactive distance determination process of step 309 by also incorporating stationary transmitters that identify fixed location information to a querying device. For example, stationary transmitters will allow the self-improving algorithm to determine on which floor an asset is located within a parking garage.

It is contemplated that steps 309 and 311 can be used to show asset 203 in a spreadsheet, on a map, by received signal strength indication (RSSI), or by any other useful form of presentation.

It is also contemplated that transmitter 205 can include sensors such as accelerometers or thermometers (not shown) that inform the database 207 and user 211 of important status changes such as asset 203 relocation or harmful interior temperatures that could result in higher maintenance costs. It will be appreciated that this functionality can be paired with software to automatically assign and track employee tasks. For example, software can associate changes to an asset's location with the querying device nearest the asset at that time to determine who would have moved the asset and to automatically task that individual with returning the asset.

An alternative embodiment for system 201 contemplates integrating steps 309 and 311 with sales data and time stamps to optimize where each asset 203 should be located within parking lot 213 to maximize sales. Another alternative embodiment contemplates integrating steps 309 and 311 with a customer relationship management platform (CRM) that can, for example, interact with the social media content of potential customers to pre-identify each customer's vehicle preferences, assign employee tasks, or alert asset owners to consumer trends. It will be appreciated that these alternative embodiments will enhance the sales experience, particularly if the respective querying devices of the employee and customer recognize proximity to each other and correlate customer preferences with inventory.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A car location identifier system for locating a plurality of cars in a parking lot having a plurality of parking spaces, the system comprising:
    a plurality of transmitter tags carried within each car of the plurality of cars, each of the transmitter tags programed with a unique identifier, the plurality of transmitter tags having a device to determine location of the plurality of transmitter tags;
    a plurality of stationary transmitters assigned to different locations within the parking lot;
    a computer database configured to receive and store data associated with the unique identifier of each transmitter tag of the plurality of transmitter tags and data associated with the plurality of stationary transmitters, data correlating a position associated with the unique identifier and a set of car parameters associated with each car of the plurality of cars in which each of the transmitter tags is carried, wherein the set of car parameters having:
        a stock number;
        a Vehicle Identification Number; and
        a car model;
    a portable computer in data communication with the computer database, the portable computer having a visual display and the portable computer having a search function configured to search the computer database for a car based on the set of car parameters;
    a processor for executing an algorithm configured to determine and program a position of the unique identifier associated with each transmitter tag of the plurality of transmitter tags and configured to determine a spatial distance between the plurality of transmitter tags and the plurality of stationary transmitters; wherein each of said plurality of transmitter tags comprises a Bluetooth beacon;
    wherein each of the plurality of transmitter tags include an accelerometer or a thermometer for indicating to the database and the portable computer location updates or harmful interior temperature status;
    wherein the processor captures a proximity data to determine and program the position associated with the unique identifier;
    wherein the proximity data includes a distance between the portable computer and each of the transmitter tag of the plurality of transmitter tags and a geo-location of the portable computer;
    wherein the processor captures a time stamp for recording a timing of the proximity data;
    wherein a location of the transmitter tag is accessed by the portable computer; wherein the portable computer provides a user directions to the transmitter tag for locating a car parked in the plurality of parking spaces.

2. A method to locate a car among a plurality of cars in a parking lot having a plurality of parking spaces, comprising:
    securing a plurality of transmitter tags within each car of the plurality of cars, wherein each of the transmitter tags is programed with a unique identifier, a Bluetooth beacon and a device to determine location of the plurality of transmitter tags;
    assigning a plurality of stationary transmitters to different locations within the parking lot;
    receiving and storing, by a computer database, data associated with the unique identifier of each transmitter tag of the plurality of transmitter tags, data associated with the plurality of stationary transmitters, data correlating a position associated with the unique identifier and a set of car parameters associated with each car of the plurality of cars;
    wherein the set of car parameters having:
        a stock number;
        a Vehicle Identification Number; and
        a car model;

programming the position associated with the unique identifier via an algorithm executed on a processor;

determining and programing, by the processor, the position associated with the unique identifier via capturing a proximity data identifying a distance between a portable computer and the transmitter tag and a geo-location of the portable computer;

determining, by the processor, a spatial distance between the plurality of transmitter tags and the plurality of stationary transmitters;

capturing a time stamp for the recording a timing of the proximity data, via the processor;

indicating to the database and the portable computer location updates or harmful interior temperature status;

searching, by the portable computer, the computer database for a car based on the set of car parameters;

accessing, by the portable computer, a location of the transmitter tag and providing a user directions to the transmitter tag for locating a car parked in the plurality of parking spaces.

\* \* \* \* \*